United States Patent [19]

Bernelin et al.

[11] 4,307,153

[45] Dec. 22, 1981

[54] CROSS-LINKABLE, SATURATED POLYESTER COATING COMPOSITIONS

[75] Inventors: Daniel Bernelin, Ris Orangis; Jacques Meyer, Paris, both of France

[73] Assignee: Chloe Chimie, Puteaux, France

[21] Appl. No.: 62,054

[22] Filed: Jul. 30, 1979

[30] Foreign Application Priority Data

Aug. 1, 1978 [FR] France .................................. 78 22666

[51] Int. Cl.³ ...................... C08L 63/00; C08L 67/00; C08L 67/02
[52] U.S. Cl. ........................................ 428/413; 427/27; 427/195; 428/418; 428/480; 525/438; 528/272
[58] Field of Search .......................... 528/272; 525/438; 428/413, 418, 480; 427/27, 195

[56] References Cited

U.S. PATENT DOCUMENTS

| | | | |
|---|---|---|---|
| Re. 29,555 | 2/1978 | Canning | 260/40 R |
| 3,080,255 | 3/1963 | Winkelmann | 428/413 |
| 3,576,903 | 4/1971 | Groff | 428/413 X |
| 3,786,004 | 1/1974 | Furuya et al. | 260/16 |
| 4,076,767 | 2/1978 | Samejima | 525/438 |
| 4,087,479 | 5/1978 | Toyota | 525/438 |
| 4,147,737 | 4/1979 | Sein et al. | 427/27 X |
| 4,182,840 | 1/1980 | Meyer et al. | 427/27 X |
| 4,223,097 | 9/1980 | Johannes et al. | 525/438 X |
| 4,268,579 | 5/1981 | Suzuki et al. | 428/413 |

*Primary Examiner*—Howard E. Schain
*Attorney, Agent, or Firm*—Burns, Doane, Swecker & Mathis

[57] ABSTRACT

Curable, saturated polyester resins and epoxy resin cross-linking agents therefor, in association with an at least divalent metal oxide and a cross-linking catalyst, are useful binders for mechanically improved powder paints, e.g., those typically applied to metallic substrates by electrostatic deposition or fluidized bed spraying.

39 Claims, No Drawings

CROSS-LINKABLE, SATURATED POLYESTER COATING COMPOSITIONS

BACKGROUND OF THE INVENTION

1. Field of the Invention

This invention relates to compositions of matter comprising a carboxylated saturated polyester and an epoxy resin cross-linking agent therefor and, more especially, relates to such resinous compositions further including a minor amount of a certain metal oxide and a cross-linking catalyst, and to the use of such compositions as binders for powder paints.

2. Description of the Prior Art

Compositions of matter useful as binders for various of the powder paints and comprising a cross-linkable, carboxylated, saturated polyester resin and an epoxide curing agent therefor are known to this art. These and other known compositions comprising the powder paints, moreover, typically include a given charge of pigment, with the ratio of the charge to binder varying over wide limits. Also typically included are such additives as spreading or flow control agents [which modify the surface tension of the paint], catalysts, colorants and the like. Preparation of the aforesaid compositions has been readily effected, usually by separately formulating the binder resin and the curing agent, optionally involving admixing and fusing the same together at a temperature lower than that at which curing or interreaction occurs, by next admixing the product of such fusion of the binder components with the pigment charge and any other additives or adjuvants at low, non-curing temperatures, followed by the ultimate grinding or powdering of the resulting mix to any suitable granulometry. The ultimate composition is thence coated onto any suitable substrate, typically a metallic substrate, e.g., by electrostatic deposition or spraying, and, subsequently, the substrate thus coated with such a powder is placed into any suitable oven or the like at a temperature in excess of that required to cause fusion and spreading of the powdery composition and, concomitantly, the cross-linking or curing of the binder. In this manner, a smooth and glossy coating is obtained. It too is known that the ultimate mechanical properties of a coating thus provided are functions of the degree or amount of cross-linking and, accordingly, of the curing time. Hence, to obtain the optimum in mechanical properties, to date it has been required that the known powdered paint compositions be cured over prohibitively long periods of time.

Thus, a great need exists in this art for improved paint compositions which permit of the attainment of paint coatings having the most desirable mechanical properties, but within the more acceptable periods of time demanded by truly economical industrial processing.

SUMMARY OF THE INVENTION

It has now surprisingly been found that, by simple incorporation into the powder of a certain metallic oxide additive and an epoxy ring-opening catalyst, it is possible to optimize the mechanical properties of a resultant paint coating by curing for a much shorter period of time than the time normally required for the cross-linking of a corresponding paint powder based upon a saturated polyester resin, but sans the additives. The novel paint compositions according to the invention thus permit of more rapid processing on an industrial scale, and accordingly, markedly diminish processing expenses.

Hence, a primary object of this invention is to provide powdery compositions of matter comprised of at least one carboxylated saturated polyester resin and at least one epoxy resin curing or cross-linking agent therefor, and which compositions can be cured at temperatures not in excess of 220° C., while at the same time yielding cross-linked, paint coatings displaying improved mechanical properties vis-a-vis those properties which can be obtained by heat treating a related composition for a lesser period of time than that normally required for a complete heat cure. It is a salient characteristic of the present invention that the subject compositions of matter include a metal oxide, the valence of the metal of which being either two or in excess of two, in addition to the at least one carboxylated, saturated, cross-linkable polyester resin and the at least one epoxy resin curing agent therefor, together with an epoxy ring-opening catalyst.

Other objects, features and advantages of the invention will become apparent from the description which follows.

DETAILED DESCRIPTION OF THE INVENTION

The carboxylated, saturated polyester resin component of the subject compositions is well known to the art, and is prepared in known manner by reacting an aromatic dicarboxylic acid or a lower alkyl diester of such aromatic dicarboxylic acid with a diol, in proportions selected as to provide resins having any desired acid and hydroxyl numbers.

Representative of such aromatic dicarboxylic acids, there are mentioned as preferred embodiments terephthalic acid and isophthalic acid, either used alone or in admixture with the saturated, aliphatic dicarboxylic acids, exemplary of which being adipic, succinic and sebacic acids.

Furthermore, in order to increase the amount of branching associated with the polyester, it is possible to use a mixture of the dicarboxylic acids with acids having more than two aromatic or aliphatic carboxylic acid groups, or ester-forming derivatives thereof. Examples of these polyacids are trimellitic acid and anhydride thereof, pyromellitic acid and anhydride thereof and butane tetracarboxylic acid and anhydride thereof. These latter comonomers are employed in such amounts that the resultant resin is neither infusible nor non-melting.

The diols which typically are used to prepare the polyester component include ethylene glycol, propylene glycol, the polyalkylene glycols comprised of ether linkages such as diethylene glycol and dipropylene glycol, butanediols, bis-hydroxyethyl-bisphenol A, neopentyl glycol and hydrogenated bisphenol A. These diols are either used alone or in admixture with each other, or with yet other diols.

In order to increase the amount of branching in the polyester, it too is envisaged to combine the foregoing diols with triols and higher polyols, such as glycerol, trimethylolpropane, trihydroxyethylisocyanurate and pentaerythritol.

It is apparent that, if the polyester is to be prevented from premature cross-linking and, thus, infusibility during its preparation, those polyacids and polyols having more than two acid functions or more than two alcohol groups can be used only within those maximum limits prescribed by Flory's law [see, e.g., Turner Alfrey, *Mechanical Behavior of High Polymers*, Volume VI, page 268, Interscience Publishers].

Typically, the saturated polyesters employed in the compositions of the invention are solid masses, with their softening points, as determined by the ball and ring method, ranging between 50° C. and 130° C., and which display acid numbers between 20 and 100 and have an hydroxyl number of less than 20, preferably less than 10. The compositions according to the invention, moreover, are not limited to but a single saturated polyester resinous component, but may also be comprised of two or more of such saturated polyesters.

The curing or cross-linking agents comprising the subject compositions are compounds comprising epoxy functions which are capable of interreacting with the reactive or carboxylic functional groups of the saturated polyester resins hereinbefore mentioned. Preferably, such epoxy compounds are at least difunctional. Exemplary of such epoxy compounds are the products of condensation between, e.g., a diphenol, such as 2,2-(4-hydroxyphenyl)propane, and an epihalohydrin, such as epichlorohydrin; the condensation reactions are per se conventional to the art. Such epoxy resins comprising the subject compositions are solid masses, with their softening points, as determined by the ball and ring method, ranging between 50° C. and 120° C., and having epoxy numbers between about 400 and 1500.

The compositions according to the invention contain, in addition to the cross-linkable, carboxylated, saturated polyester resin and the epoxy curing agent defined above, a metal oxide, the valence of the metal of which being either two or in excess of two, and which metal oxide is preferably selected from the group consisting of zinc, magnesium, cadmium, iron (II), and the alkaline earth metal oxides. Preferably, the metal oxide is utilized in its anhydrous form or is dried to a temperature whereby no further water evolves therefrom; this metal oxide may optionally be in its hydrated form during cure and advantageously is in the form of a fine powder, preferably having particle sizes of less than 10 microns. The content by weight of the metal oxide with respect to the total amount of polyester resin and epoxy resin curing agent therefor ranges between 0.1% and 5%, and preferably ranges between 0.5% and 3%.

Also comprising the compositions according to the invention is a catalyst which is an epoxy ring-opening catalyst. Preferably, such catalysts are at least divalent organometallic salts, e.g., of such metals as zinc or magnesium and of such mono- or polyvalent organic moieties as have from 2 to 20 carbon atoms; purely for practical purposes, though, and without implying any limitation on the invention, the acetylacetonyl compounds are the preferred. The amount of weight of the catalyst and respect to the total amount of polyester resin and epoxy resin curing agent therefor ranges between 0.1% and 5%, and preferably ranges between 0.5% and 3%.

The compositions according to the invention are readily cross-linked by polyaddition and/or polycondensation at temperatures of from 160° and 220° C. for periods of time which vary between 5 and 40 minutes. The ratio by weight of the saturated polyester resin to the epoxy curing or cross-linking agent may vary considerably in consideration of the acid number of the polyester resin and the epoxy equivalent of the curing agent. Usually, the weight ratio is such that there essentially exists an equilibrium in the final composition between the number of reactive functions in the saturated resin and the number of reactive functions in the curing agent.

Powder paint formulations comprising the compositions of the invention typically include the classical additives which are well known to the paint industry, such as the various fillers, pigments, colorants, and the like. Flow control or spreading agents, such as the commonly employed acrylic polymers and silicone oils, too may be included, usually in amounts ranging from between 0.1% and 1% by weight.

The metal oxide and catalyst components of the subject compositions can be incorporated into the polyester epoxy curing agent binders by any one of a number of means, preferably either by admixing same, under agitation, with the formation of a simple mechanical admixture of the several ingredients prior to ultimate mixing and formulation of the composition through fusion and grinding. Accordingly (i) the ground polyester resin, (ii) the ground curing agent, (iii) the metal oxide and the catalyst and (iv) the optional various additives therefor are intimately mixed in dry state in a conventional powder mixer, and the mixture next fused in a conventional fusion mixer, e.g., a Banbury or Buss mixer, at a temperature not exceeding 120° C. and preferably either less than or equal to 100° C. The mixture is then cooled and finely ground to particle sizes on the order of 20 to 100 microns, and thence screened. The mixtures thus obtained can then be coated onto any suitable substrate, advantageously one that has previously been degreased and which is heat-resistant, for example, any one of a number of the metal substrates or ceramics. The application itself is by means of such known methods as, e.g., electrostatic deposition or fluidized bed coating; the coatings are next cross-linked at temperatures of from about 150° to 200° C. for from about 5 to 40 minutes. The average thickness of a coating thus obtained on any given support typically falls within the range of from between 30 to 100 microns. The compositions according to the invention provide cross-linked coatings having enhanced impact resistances, measured in accordance with the French standard NFT 30039, which may be as high as, or greater than, 50 kg/cm.

The compositions according to the invention comprise paint binders for paints finding use in all of the automotive, electrical household goods, agricultural machinery, and lead and other industries.

In order to further illustrate the invention and the advantages thereof, the following specific examples are given, it being understood that same are intended only as illustrative and in nowise limitative. In the examples which follow, all parts are given by weight, unless otherwise indicated.

EXAMPLE 1

[A] Preparation of the Polyester Resin

As a representative carboxylated polyester resin, a polymer reflecting the following molar composition was employed:

| | |
|---|---|
| [i] Isophthalic acid | 1 mole |
| [ii] Adipic acid | 0.2 mole |
| [iii] Propylene Glycol | 1.37 mole |
| [iv] Trimellitic anhydride | 0.1 mole |

In a polycondensation reactor having a capacity of 4 liters and equipped with an agitator, a heating jacket and cooling means, as well as a nitrogen gas inlet tube, the following mixture was heated and reacted at 200° C. under a nitrogen atmosphere:

[a] 1660 g Isophthalic acid;
[b] 384 g Trimellitic acid;
[c] 1079 g propylene glycol; and
[d] 292 g adipic acid until a resin having an acid number of 85 and a hydroxyl number of 5 was obtained. The resin was cast, cooled and ground. Its melting point, determined by the ball and ring method, was 83° C.

[B] The Epoxy Resin Curing Agent

A commercially available epoxy resin marketed by the Shell Company under the designation Epikote 1004, having an epoxy index of 840 to 950, was employed.

[C] Preparation of the Coating Compositions

The resultant mixture was extruded in a Buss mixer at a temperature of 100° C. and the product of extrusion was ground and screened on a sieve of 100 micron mesh. The powder which was obtained was applied, by means of an electrostatic sprayer (Trademarked "SAMES") to a steel plate (previously degreased) having dimensions of 20 cm×10 cm×0.08 cm. The plate was then cured at 180° C. for 15 minutes (Condition "a" of Table II) and then for an additional 30 minutes (Condition "b" of Table II).

After cooling, the following properties of the paint film were measured:

[1] Impact strength: measured by the NFT 30039 standard;
[2] Erichsen deep drawing test: measured by the NFT 30019 standard; and
[3] ASTM bend test: measured according to the ASTM D 522-60 standard.

The various results obtained are compiled in Table II.

TABLE I

| | Paint Compositions (Parts by Weight) | | | | | | | | | | | | | | | |
|---|---|---|---|---|---|---|---|---|---|---|---|---|---|---|---|---|
| | Composition No. | | | | | | | | | | | | | | | |
| Ingredients | 1 | 2 | 3 | 4 | 5 | 6 | 7 | 8 | 9 | 10 | 11 | 12 | 13 | 14 | 15 | 16 |
| Polyester Resin According to [A] Above | 50 | 50 | 50 | 50 | 50 | 50 | 50 | 50 | 50 | 50 | 50 | 50 | 50 | 50 | 50 | 50 |
| Epoxy Resin According to [B] Above | 50 | 50 | 50 | 50 | 50 | 50 | 50 | 50 | 50 | 50 | 50 | 50 | 50 | 50 | 50 | 50 |
| TiO$_2$ rutile[1] | 50 | 50 | 50 | 50 | 50 | 50 | 50 | 50 | 50 | 50 | 50 | 50 | 50 | 50 | 50 | 50 |
| Spreading Agent[2] | 2 | 2 | 2 | 2 | 2 | 2 | 2 | 2 | 2 | 2 | 2 | 2 | 2 | 2 | 2 | 2 |
| Zinc Oxide[3] | — | 1 | 2 | — | — | 1 | 1 | — | — | 1 | 1 | — | — | — | — | — |
| Magnesium Oxide[4] | — | — | — | — | — | — | — | — | — | — | — | 1 | 1 | 1 | 1 | 1 |
| Zinc Acetyl Acetonate[5] | — | — | — | 1 | 2 | 1 | 2 | — | — | — | — | — | 1 | 2 | — | — |
| Magnesium Acetyl Acetonate[6] | — | — | — | — | — | — | — | 1 | 2 | 1 | 2 | — | — | — | 1 | 2 |

[1]KRONOS CL 220, marketed by Societe Industrielle du Titane;
[2]ACRONAL 4 F, acrylic polymer marketed by the BASF Co.;
[3]CODEX extra pure quality zinc oxide;
[4]Calcined magnesium oxide, marketed by PROLABO Co.;
[5]Marketed by DYNAMIT NOBEL; and
[6]Marketed by DYNAMIT NOBEL.

The ingredients of the different compositions noted in Table 1 were placed into and homogenized in a powder mixer.

TABLE II

| | | | PROPERTIES AND COMMENTS | | | |
|---|---|---|---|---|---|---|
| Composition | Curing Conditions | Film Thickness (μ) | Erichsen Test NFT 30019 | Impact Test NFT 30039 (kg/cm) | Bend Test ASTM D 552-60 E % | φ mm |
| 1 | a | 52 | 1.5 | 2 | 2.9 | 38 |
| | b | 53 | 2 | 5 | 2.9 | 38 |
| 2 | a | 50 | 1.25 | 2 | 2.9 | 38 |
| | b | 54 | 2 | 6 | 2.9 | 38 |
| 3 | a | 57 | 1.4 | 1.4 | 2.9 | 38 |
| | b | 58 | 1.1 | 1.5 | 2.9 | 38 |
| 4 | a | 63 | 1.8 | 2 | 2.9 | 38 |
| | b | 52 | 4.1 | 14 | 8.65 | 15.8 |
| 5 | a | 51 | 3.2 | 19 | 8.77 | 15.8 |
| | b | 60 | 3 | 19 | 8.77 | 15.8 |
| 6 | a | 48 | 6.2 | 19 | >32 | <3 |
| | b | 45 | 7 | 55 | >32 | <3 |
| 7 | a | 44 | 4 | 20 | 15.8 | 8.51 |
| | b | 46 | 7 | 65 | >32 | <3 |
| 8 | a | 55 | 0.8 | 2 | 2.9 | 38 |
| | b | 62 | 1.5 | 2 | 2.9 | 38 |
| 9 | a | 68 | 1.4 | 2 | 2.9 | 38 |
| | b | 65 | 3 | 2 | 8.86 | 15.8 |
| 10 | a | 68 | 0.8 | 2 | 2.9 | 38 |
| | b | 45 | 4.1 | 25 | >32 | <3 |
| 11 | a | 55 | 1 | 2 | 2.9 | 38 |

TABLE II-continued

PROPERTIES AND COMMENTS

| Composition | Curing Conditions | Film Thickness (μ) | Erichsen Test NFT 30019 | Impact Test NFT 30039 (kg/cm) | Bend Test ASTM D 552-60 E % | Bend Test ASTM D 552-60 φ mm |
|---|---|---|---|---|---|---|
|  | b | 64 | 4.8 | 25 | 8.75 | 15.8 |
| 12 | a | 66 | 1.5 | 2 | 2.9 | 38 |
|  | b | 70 | 1.5 | 2–3 | 2.9 | 38 |
| 13 | a | 64 | 3.5 | 10–15 | 12.5 | 13.8 |
|  | b | 68 | 4 | 30–40 | 14.3 | 11.90 |
| 14 | a | 72 | 4 | 30–35 | 13.2 | 12.6 |
|  | b | 68 | 4 | 25–35 | 13.3 | 12.5 |
| 15 | a | 62 | 2 | 5–10 | 2.8 | 16 |
|  | b | 60 | 3 | 10–15 | >32 | <3 |
| 16 | a | 60 | 1.4 | 4–5 | 5.1 | 12.5 |
|  | b | 68 | 4.5 | 10–15 | 16 | 13.8 |

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims.

What is claimed is:

1. A powdery composition of matter comprising (i) a cross-linkable, carboxylated, saturated polyester resin; (ii) an epoxy resin cross-linking agent for the polyester (i), (iii) a metallic oxide, the metal cation of which is selected from the group consisting of zinc, magnesium, cadmium, iron (II) and alkaline earth; and (iv) an epoxy ring-opening catalyst.

2. The composition of matter as defined by claim 1, wherein the polyester resin (i) is a solid, having a softening point between about 50° C. and 130° C., having an acid number between 20 and 100 and having a hydroxyl number of less than 20.

3. The composition of matter as defined by claim 2, wherein the amount of metal oxide present is between about 0.1% and 5% by weight, with respect to the total weight of the polyester resin and the epoxy resin.

4. The composition of matter as defined by claim 3, wherein the catalyst (iv) is an at least divalent organometallic salt.

5. The composition of matter as defined by claim 4, wherein the amount of catalyst present is between about 0.1% and 5% by weight, with respect to the total weight of the polyester resin and the epoxy resin.

6. The composition of matter as defined by claim 4, further including a member selected from the group consisting of filler, pigment, colorant, flow control agent, and mixtures thereof.

7. The composition of matter as defined by claim 2, wherein the epoxy resin (ii) is a solid, having a softening point between about 50° C. and 120° C., and having an epoxy number of between about 400 and 1500.

8. The composition of matter as defined by claim 7, said epoxy resin being the condensation product of a diphenol and an epihalohydrin.

9. The composition of matter as defined by claim 5, wherein the polyester resin comprises the reaction product of an aromatic dicarboxylic acid, or ester-forming derivative thereof, and a diol.

10. The composition of matter as defined by claim 9, wherein the aromatic dicarboxylic acid is selected from the group consisting of terephthalic acid and isophthalic acid.

11. The composition of matter as defined by claim 10, wherein the diol is selected from the group consisting of ethylene glycol, polyalkylene glycol, butanediol, bis-hydroxyethyl-bisphenol A, neopentyl glycol and hydrogenated bisphenol A.

12. The composition of matter as defined by claim 11, further including a member selected from the group consisting of an aromatic polycarboxylic acid having in excess of two carboxylic acid functions, an aliphatic polycarboxylic acid having in excess of two carboxylic acid functions, and the ester-forming derivatives thereof.

13. The composition of matter as defined by claim 12, wherein such polycarboxylic acids are selected from the group consisting of trimellitic acid and anhydride thereof, pyromellitic acid and anhydride thereof, and butane tetracarboxylic acid and anhydride thereof.

14. The composition of matter as defined by claim 11, further comprising a saturated aliphatic dicarboxylic acid.

15. The composition of matter as defined by claim 14, wherein the saturated, aliphatic dicarboxylic acid is selected from the group consisting of adipic acid, succinic acid and sebacic acid.

16. The composition of matter as defined by claim 11, further comprising an at least triol.

17. The composition of matter as defined by claim 16, wherein said at least triol is selected from the group consisting of glycerol, trimethylolpropane, trihydroxyethylisocyanurate and pentaerythritol.

18. The composition of matter as defined by claim 3, wherein the metal oxide is finely powdered.

19. The composition of matter as defined by claim 18, wherein the metal oxide is finely powdered to a particle size of less than 10 microns.

20. The composition of matter as defined by claim 3, the amount of metal oxide ranging between about 0.5% and 3% by weight.

21. The composition of matter as defined by claim 1, wherein the weight ratio of polyester to cross-linking agent is such that the total number of reactive carboxylic functions in the polyester is substantially stoichiometrically equal to the total number of reactive epoxy functions in the cross-linking agent.

22. The composition of matter as defined by claim 1, wherein said metal oxide is zinc oxide.

23. A process for the formulation of the compositions of matter as defined by claim 1, comprising physically admixing the four components in dry state, next homogenizing and fusing the resulting admixture at a temperature less than 120° C., and thence cooling and grinding the product of fusion.

24. The process as defined by claim 23, wherein the fusion is at a temperature of less than 100° C., the product is ground to particle seizes of between 20 to 100 microns, and the ground product screened.

25. A coating composition comprising the composition of matter as defined by claim 1.

26. The coating as defined by claim 25 which comprises a powder paint.

27. A cross-linked polymeric matrix, comprising the autoreaction product of the composition of matter as defined by claim 1.

28. A coated substrate, the coating comprising the cross-linked polymeric matrix as defined by claim 27.

29. The coated substrate as defined by claim 28, the coating comprising a paint.

30. The coated substrate as defined by claim 29, the substrate coated being selected from the group consisting of a metal and a ceramic.

31. A process for preparing a coated substrate comprising applying to a substrate, in powder form, the composition of matter as defined by claim 1, and thence heat curing the same for from 5 to 40 minutes at a temperature of from 150° C. to 200° C.

32. The process as defined by claim 31, wherein the application is by electrostatic deposition.

33. The process as defined by claim 32, wherein the application is by fluidized bed spraying.

34. The composition of matter as defined by claim 2, said polyester resin having a hydroxyl number of less than 10.

35. The composition of matter as defined by claim 8, said epoxy resin being the condensation product of 2,2-(4-hydroxyphenyl)propane and epichlorohydrin.

36. The composition of matter as defined by claim 5, the amount of catalyst ranging between about 0.5% and 3% by weight.

37. The composition of matter as defined by claim 4, said organometallic salt comprising a cation selected from the group consisting of magnesium and zinc.

38. The composition of matter as defined by claim 37, said organometallic salt comprising an organic moiety having from 2 to 20 carbon atoms.

39. A composition of matter as defined by claim 38, said organometallic salt being an acetylacetonate.

* * * * *